United States Patent [19]

Gayton et al.

[11] Patent Number: 5,038,814
[45] Date of Patent: Aug. 13, 1991

[54] BACK FLOW PREVENTER AND INTEGRAL VACUUM BREAKER

[75] Inventors: David E. Gayton, Bay Village; Michael A. Brattoli, Elyria, both of Ohio

[73] Assignee: Moen Incorporated, Elyria, Ohio

[21] Appl. No.: 538,751

[22] Filed: Jun. 15, 1990

[51] Int. Cl.[5] .............................................. F16K 24/00
[52] U.S. Cl. ..................................... 137/218; 137/512; 137/512.4
[58] Field of Search ....................... 137/218, 512, 512.4

[56] References Cited

U.S. PATENT DOCUMENTS

| | | | |
|---|---|---|---|
| 2,211,212 | 8/1940 | Langdon | 137/512 |
| 2,322,631 | 6/1943 | Groeniger | 137/512.4 X |
| 3,633,613 | 1/1972 | Julow | 137/512 X |
| 4,084,606 | 4/1978 | Mittleman | 137/512.4 X |

Primary Examiner—Gerald A. Michalsky
Attorney, Agent, or Firm—Kinzer, Plyer, Dorn, McEachran & Jambor

[57] ABSTRACT

A back flow preventer and vacuum breaker for use with a plumbing fixture in which the discharge may be moved to a position within a body of water includes a body having an inlet and an outlet, a chamber connecting the inlet and outlet and an air vent opening into the chamber. There is a first diaphragm positioned within the chamber which controls air flow through the vent. There is a second diaphragm positioned in the chamber which controls flow from the inlet into the chamber and includes an integral check valve extending into the outlet.

10 Claims, 1 Drawing Sheet

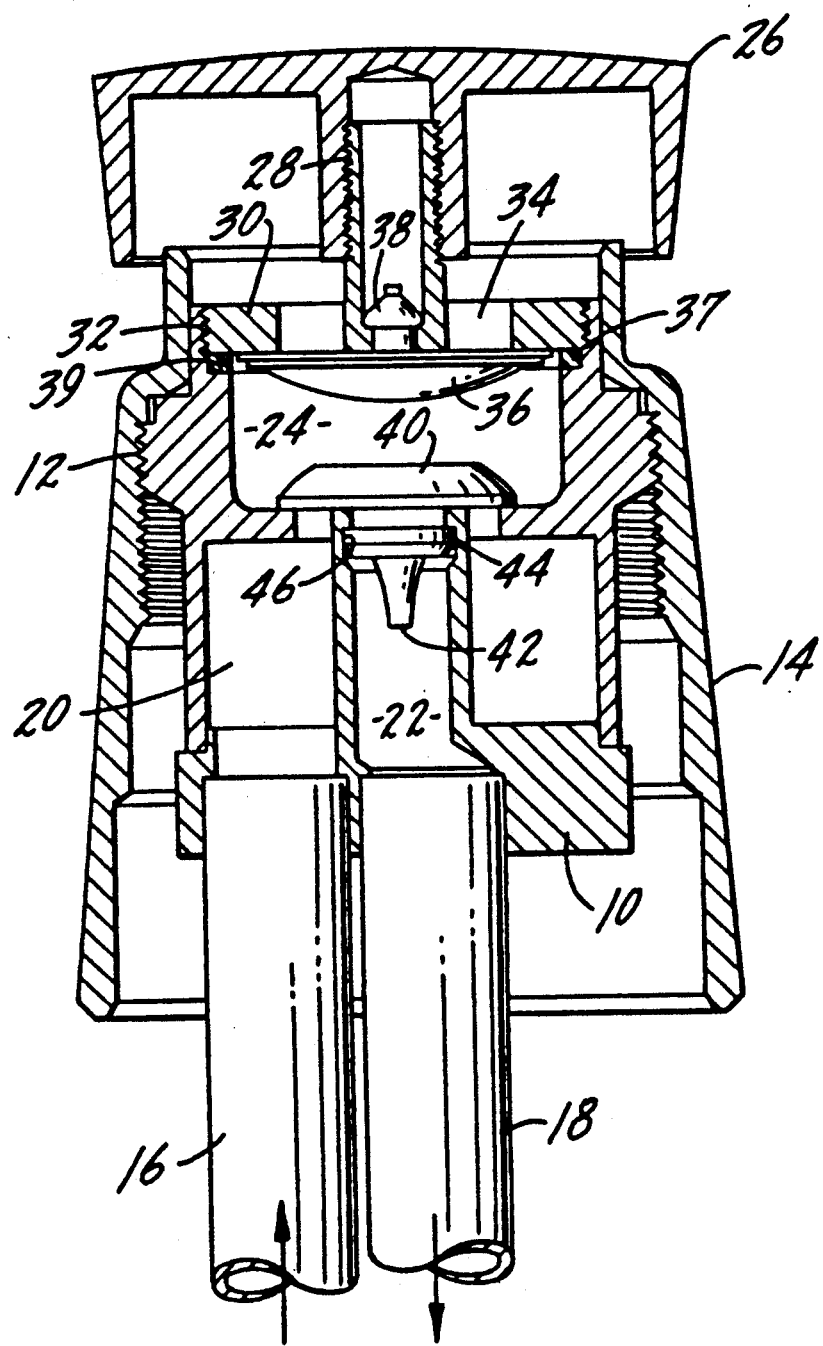

BACK FLOW PREVENTER AND INTEGRAL VACUUM BREAKER

SUMMARY OF THE INVENTION

The present invention relates to a back flow preventer and vacuum breaker for use with plumbing fixtures such as hand showers and kitchen pull out spouts.

A primary purpose of the invention is a device as described usable with a movable plumbing fixture which may have its discharge positioned within a body of water which device functions to prevent back flow and remove a vacuum condition in the inlet.

Another purpose is a simply constructed reliable vacuum breaker which has no moving parts.

Another purpose is a combination back flow preventer and vacuum breaker using a first seal to control an air vent passage and a second seal to control both back flow and flow between the inlet and outlet.

Another purpose is a device as described which has a check valve integral with the diaphragm seal controlling flow between the inlet and outlet.

Another purpose of the invention is to provide a back flow preventer as described which will eliminate the characteristic dripping which comes from a hand shower if such is raised above the level of a tub deck or the like.

Other purposes will appear in the ensuing specification, drawing and claims.

BRIEF DESCRIPTION OF THE DRAWINGS

The invention is illustrated diagrammatically in the attached axial section through a back flow preventer and vacuum breaker as described.

DESCRIPTION OF THE PREFERRED EMBODIMENT

Present day plumbing fixtures for both the kitchen and bath include hand held devices which can be moved about and may at times have the discharge positioned within a body of water such as a sink or bathtub. Specifically, in Roman tubs it is common to provide a hand held shower. In such an installation a diverter is required and plumbing codes now require a means for preventing back siphonage in connection with a diverter and a hand held shower. Much the sam is true in the kitchen in which pull out spouts have become common and require by code, a device to prevent back siphonage. The present invention prevents back flow and removes a vacuum condition at the water supply, meeting code requirements for plumbing fixtures in which the discharge from the fixture, at times, may be positioned within a body of water. In addition, the device of the present invention, which relies upon a plurality of flexible seal members, provides an audible tone if the device is fouled or non-operational.

In the drawing, the back flow preventer and vacuum breaker has a body 10 which has an exterior thread 12 used to mount an exterior decorative escutcheon 14. Body 10 mounts an inlet conduit 16 and an outlet conduit 18. Conduit 16 connects to an inlet passage 20 and conduit 18 connects to an outlet passage 22, with these two passages terminating in a chamber 24.

A cap 26 is mounted on to the stem 28 of a cover 30, with the cover being threadedly engaged, as at 32, with the upper end of body 10.

Cover 30 has a plurality of vent passages 34 which connect chamber 24 to atmosphere. Cover 30 mounts a diaphragm type seal 36 with the outer peripheral areas of the diaphragm covering vent passages 34. The cover is seated on a seal ring 37 that is held between the cover and shoulder 39 of body 10. The diaphragm has a central axial extension or plug 38 which extends into an opening in stem 28 to mount the diaphragm to the cover. If the air pressure in chamber 24 is less than atmospheric the diaphragm will open to permit the flow of air through the vent passages and into the chamber.

A peripheral seal indicated generally at 40 controls the flow between inlet passage 20 and outlet passage 22. Seal 40, again a diaphragm type seal, has its outer peripheral areas covering inlet passage 20 with the seal having an integral duckbill type check valve 42 which extends down into outlet passage 22. The duckbill seal has an outwardly extending shoulder 44 which extends into a mating groove 46 on the interior wall of outlet passage 22 thereby mounting diaphragm seal 40 to body 10.

The back flow preventer and vacuum breaker shown herein is normally mounted on the deck of a sink o tub and is specifically to prevent back pressure, back flow and back siphonage. Under normal operating conditions, water will flow from conduit 16 into inlet passage 20, water pressure will raise the periphery of diaphragm seal 40 so that water will flow into chamber 24. The water in the chamber will then open the flexible lips of the duckbill 42 s that water flows into outlet passage 22 and then into outlet conduit 18. If a movable discharge device connected to outlet conduit 18 should be placed within a body of water and if the pressure at that point should be greater than the inlet pressure, water could flow in the reverse direction through conduit 18 into outlet passage 22. However, the duckbill seal will close under such conditions preventing any back flow from the outlet to the inlet.

Another possible abnormal condition which might result in water flowing back to the potable water supply system, an undesirable result, is when the supply line loses pressure, in which case the pressure at inlet conduit 16 would be less than atmospheric pressure with the result that water could be drawn from the discharge side o the device. This is prevented both by the flexible lip seal 42 and by the fact that such a vacuum condition will draw the exterior portion of diaphragm 40 down tightly on the inlet passage 20. Also, any negative pressure at the inlet will cause diaphragm seal 36 to open as there is a minimum load on this seal which normally closes the vent passages. Thus a slightly below atmosphere pressure in chamber 24 will cause vent passages 34 to open thereby causing air to flow into chamber 24 and relieve the vacuum condition in the supply line, also breaking any siphon condition that may exist.

The invention provides three different seal closures to prevent water from discharge passage 22 from reaching inlet passage 20. There is the duckbill 42, the diaphragm portion of seal 40 and diaphragm seal 36 which can be used to relieve any vacuum condition at the inlet. Since it is possible in any water system for impurities to be in the water, which impurities can be of the size to hold open a valve, the present invention provides multiple sealing points to prevent back flow. If the duckbill seal is held open, the diaphragm seal 40 functions as the back up. If the diaphragm seal should be held open, a vacuum condition is broken by the vent passages 34.

It is not uncommon with movable plumbing fixtures, particularly hand held showers, for the shower to be held above the level of the deck, which may, when the device is turned off, cause water to flow back through the discharge toward inlet passage 20. There will be no dripping out of the back flow preventer under such circumstances as flow cannot pass through the duckbill seal 42 and is backed up by diaphragm 36.

Of particular advantage in the structure shown is that the flexible elastomeric diaphragm type seals, including the duckbill 42, all tend to vibrate if air passes through them. Such vibration provides an audible tone clearly indicating that there is a loss of pressure in the line and the plumbing system requires service. The tone for the different flexible members is not of the same frequency, but is of similar frequencies and any one or more of the seal members may be placed in a vibratory condition by lost pressure in the line.

Whereas the preferred form and several variations of the invention have been shown, described, and suggested, it should be understood that suitable additional modifications, changes, substitutions and alterations may be made without departing from the invention's fundamental theme. It is therefore wished that the invention be unrestricted except as by the appended claims.

The embodiments of the invention in which an exclusive property or privilege is claimed are defined as follows:

1. A back flow preventer and vacuum breaker for use with a plumbing fixture in which the discharge may be moved to a position within a body of water including a body having an inlet and an outlet, a chamber connecting said inlet and outlet, a vent in communication with said chamber, a first flexible seal positioned within said chamber and controlling air flow through said vent into said chamber, and a second flexible seal positioned within said chamber and having an exterior portion controlling communication between said inlet and chamber, said second flexible seal having a centrally located integral check valve controlling back flow from said outlet to said chamber, water flow from said inlet moving said second flexible seal to open communication with said outlet through said check valve.

2. The back flow preventer of claim 1 further characterized in that said second flexible seal controlling communication between said inlet and chamber is a diaphragm type seal.

3. The back flow preventer of claim 2 further characterized in that said inlet is positioned radially outside of said outlet, with said integral check valve extending into said outlet.

4. The back flow preventer of claim 3 further characterized that said check valve includes a pair of normally closed flexible lips extending into said outlet.

5. The back flow preventer of claim 3 further characterized in that said second flexible seal extends radially outwardly from said integral check valve, to flexibly cover said inlet.

6. The back flow preventer of claim 1 further characterized in that said first flexible seal is a diaphragm type seal having central mounting and a flexible periphery.

7. The back flow preventer of claim 1 further characterized in that said vent includes a plurality of circumferentially arranged vent passages, said first flexible seal covering said vent passages.

8. The back flow preventer of claim 1 further characterized in that said outlet is positioned generally coaxial within said body, said inlet being radially outside of said outlet, said integral check valve having a pair of flexible lips and extending into said outlet, said second flexible seal being a diaphragm type seal which extends radially outwardly from said flexible lips.

9. The back flow preventer of claim 8 further characterized in that said vent includes a plurality of passages, said first seal being a diaphragm seal having a mounting coaxial with said check valve.

10. The back flow preventer of claim 9 further characterized by and including a cover for said body, said cover including said vent passages and said seal and being removable from said body.

* * * * *